3,166,807
REUSEABLE HOT TOP
Robert E. Daley, 8355 Remington Drive, Pittsburgh, Pa.
Filed Sept. 28, 1962, Ser. No. 226,896
2 Claims. (Cl. 22—147)

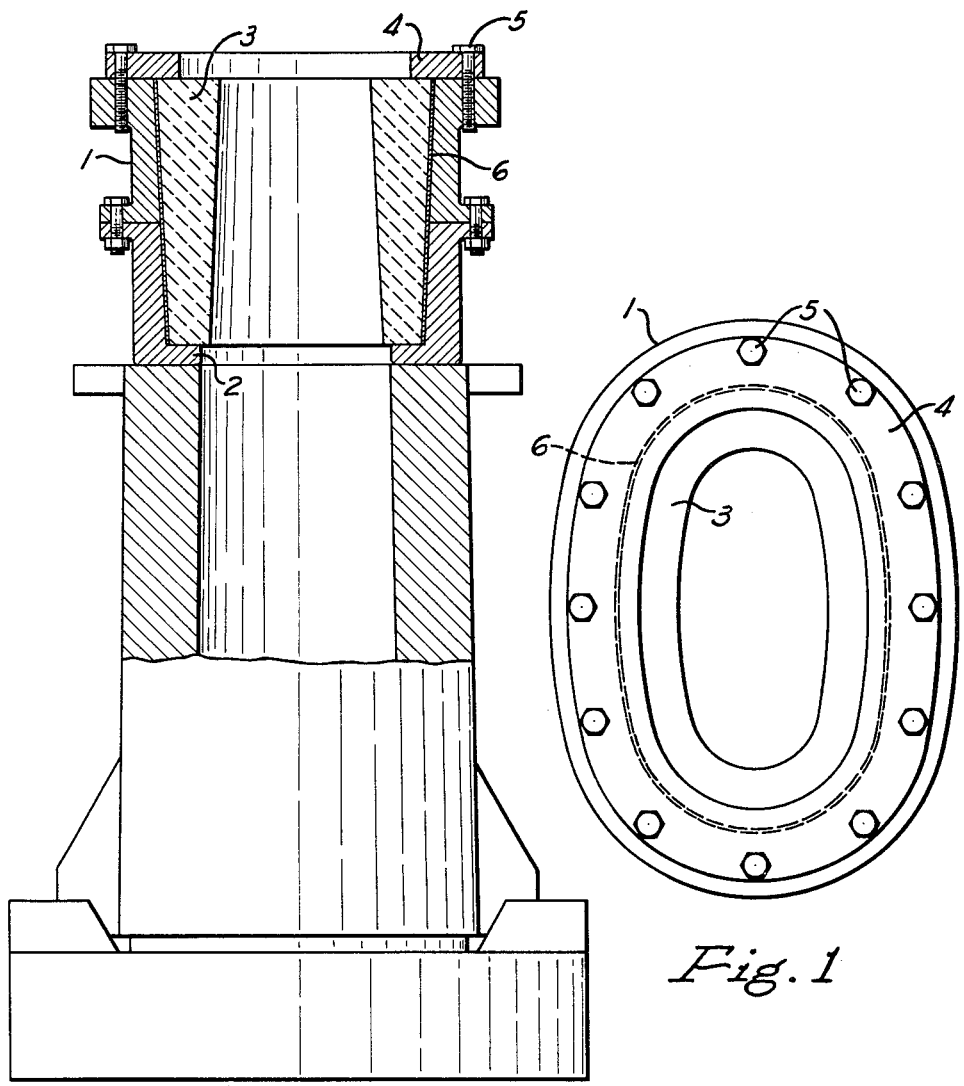

This invention relates to ingot mold hot tops, and more particularly to reuseable hot tops provided with refractory linings.

Heretofore, hot tops have consisted of a cast iron or steel casing provided with a thick refractory lining usually having a downwardly diverging inner surface. The bottom of the casing has an inwardly projecting ledge on which the lining rests. The inner surface of the casing has either diverged downwardly or been vertical. In the latter case the casing is provided at its top with an inwardly projecting lip to prevent the lining from escaping if the hot top is inverted. These hot tops have two distinct disadvantages. Because the bottom ledge of the metal casing supports the lining, that ledge must carry all the weight of the ingot as the hot top is stripped from it. Sometimes the mold weight is added to this when the mold and ingot become stuck together. In either case the casing ledge may be ruined, requiring the hot top to be scraped. To reuse a hot top, the refractory lining must be removed from the metal casing and a new lining formed. Removing a monolithic lining is difficult and expensive. It generally requires a man with a heavy pneumatic hammer to work as much as two days on a large hot top.

It is among the objects of this invention to provide a reuseable hot top, in which any load on the lining during stripping is distributed throughout the metal casing instead of being concentrated on its lower ledge, and from which the refractory lining can be removed easily and quickly.

The preferred embodiment of the inveniton is illustrated in the accompanying drawings, in which FIG. 1 is a plan view of my hot top; and FIG. 2 is a central vertical section through the hot top resting on an ingot mold that is partly broken away in section.

Referring to the drawings, the cast hot top casing 1 may have any desired shape in horizontal section. The bottom of the casing is provided with the usual integral inwardly projecting ledge 2, but there is no permanent lip around the inside of the top of the casing. It is a feature of this inveniton that the inner surface of the casing converges downwardly from the top of the casing to the bottom ledge and that the refractory lining 3 is tapered downwardly to the same degree. The inner surface of the lining converges upwardly as is customary. Consequently, the side wall of the lining tapers downwardly in vertical section and engages the ledge. To prevent the lining from accidentally escaping from the casing before the hot top is used, the lining may be locked inside the casing by suitable means, such as a ring 4, removably connected to the top of the casing by threaded studs 5 or the like and projecting in over the top of the lining.

Any possibility of the refractory lining bonding to the inside of the metal casing may be avoided by separating them with a layer of separating material 6 that will burn out or deteriorate under the high temperatures encountered in use. For this purpose paper, fabric, metal, grease and other materials can be used. Aluminum foil is especially desirable as it also reduces heat transfer from the refractory lining to the metal casing.

After the hot top has been used and it is desired to recondition it for reuse, the retaining ring 4 is removed from the metal casing and then the latter is inverted and struck with a hammer to loosen the lining so that it will drop out, due to its taper. Any weight or load suspended from the lining during stripping of the hot top from an ingot is distributed throughout the inclined side wall of the metal casing, because the downwardly tapered lining will wedge itself against the adjoining inner surface of the casing from top to bottom and not be supported entirely by the bottom ledge.

This invention therefore makes it possible to quickly and easily remove a refractory lining from a hot top casing, and to greatly prolong the life of the casing.

According to the provisions of the patent statutes, I have explained the principle of my invention and have illustrated and described what I now consider to represent its best embodiment. However, I desire to have it understood that, within the scope of the appended claims, the inveniton may be practiced otherwise than as specifically illustrated and described.

I claim:

1. An ingot mold hot top comprising a hollow metal casing open at top and bottom and provided at its bottom with an inwardly projecting ledge, the inner surface of the casing from the ledge to the top of the casing diverging upwardly and a refractory lining tapered from top to bottom and substantially engaging said surface and ledge.

2. An ingot mold hot top comprising a hollow metal casing provided at its bottom with an inwardly projecting ledge, the inner surface of the casing from the ledge to the top of the casing diverging upwardly, a refractory lining engaging said surface and ledge, and means removably connected to the top of said casing and overlying the top of the lining to hold the lining against said ledge of the casing is inverted.

References Cited by the Examiner
UNITED STATES PATENTS

| 1,180,677 | 4/16 | Thackray | 22—147 |
| 1,207,054 | 12/16 | Kenney | 22—147 |
| 2,863,192 | 12/58 | Kauffman | 22—147 |

FOREIGN PATENTS 682,311   11/52   Great Britain.

MICHAEL V. BRINDISI, *Primary Examiner.*
MARCUS U. LYONS, *Examiner.*